March 11, 1952     W. E. TURVEY     2,588,672
LIQUID LEVEL CONTROL
Filed April 27, 1946
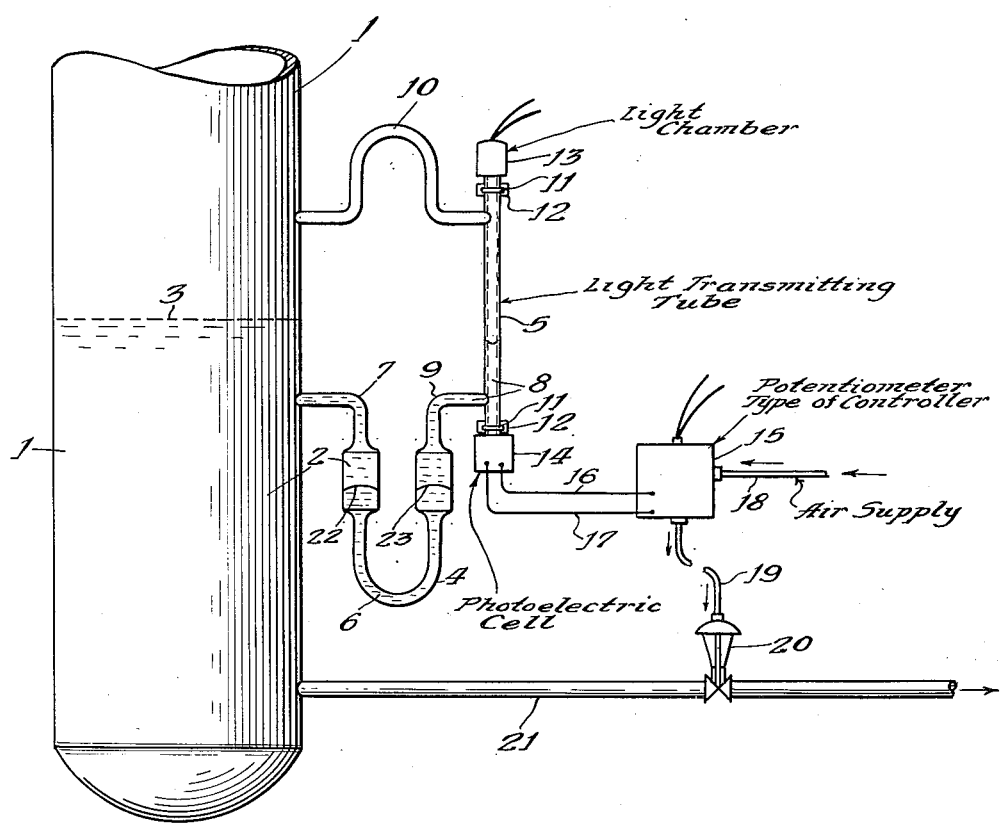
Inventor:
William E. Turvey
By: Maynard P. Venema
Attorney.

Patented Mar. 11, 1952

2,588,672

UNITED STATES PATENT OFFICE 2,588,672

LIQUID LEVEL CONTROL

William E. Turvey, Oak Park, Ill., assignor to Universal Oil Products Company, Chicago, Ill., a corporation of Delaware Application April 27, 1946, Serial No. 665,370

4 Claims. (Cl. 250—218)

This invention relates to an improved method and apparatus for controlling liquid levels in liquid retaining chambers. More specifically, the improved apparatus relates to the use of a photoelectric cell to maintain a desired liquid level in a chamber, the photoelectric cell operating flow control means in response to the light intensity which is transmitted vertically through a varying height column of colored or semi-opaque liquid in an enclosed light transmitting tube. The liquid column in the light tube is in communication with the liquid material in the chamber, such that liquid level changes in the latter chamber will effect corresponding changes in the height of the semi-opaque liquid column in the light tube.

One of the objects of this invention is to provide an improved method and apparatus for automatically controlling the liquid level in a liquid retaining chamber.

Another object of the invention is to provide control means wherein physical or mechanical contact with the liquid material itself is completely eliminated.

A still further object of the invention is to provide an automatic method for liquid level control which effects a throttling of the liquid flow to or from the liquid chamber, rather than employ an "on and off" operation to maintain a substantially constant liquid level.

In the majority of the present types of level control apparatus or methods used, an actual contact with the liquid in the column by floating members, contact points, or other mechanical means is necessary. Liquid contacting members are normally inserted within the chamber, or an adjacent reservoir, such that packing glands and liquid seals are necessary for their installation. Electrical contact points, coils, and the like, also normally require insulating or non-conducting materials in connection with their installation. It may be further noted that many of the present types of automatic control devices operate in an "on and off" manner, that is, the inlet or outlet flow is started and stopped, to or from the chamber, as the liquid level rises and falls between certain predetermined limits within the chamber, and a throttling action is not obtained in the maintenance of the desired liquid level.

One of the advantageous features of this invention is the throttling action which can readily be obtained by the use of a photoelectric cell from which the electrical output will vary. A photoelectric cell is sensitive to the quantity of light which is transmitted to it, and in this invention light rays are passed through a column of colored or semi-opaque liquid within a light transmitting tube, such that the light intensity to the cell will vary as the height of the liquid column is in turn varied by the liquid level height in the connecting liquid retaining chamber.

Another advantageous feature of this invention is the elimination of all mechanical liquid contacting members, electrical contacts, or the like, in either the liquid chamber or a reservoir which may be attached thereto. In addition, it has been found in the operation of many experimental or commercial plants, that it is desirable to have a minimum liquid hold-up at any point and that a smoother operating unit can be attained when the liquid flows are throttled, rather than irregularly stopped and started.

The accompanying drawing will serve to illustrate the construction and arrangement of the level control apparatus in a diagrammatic manner and will aid in the description of its operation.

Numeral 1 of the drawing, refers to a chamber or vessel for receiving a liquid 2, the level of which it is desired to maintain substantially constant at a level indicated by the broken line 3. A U-tube 4 serves to connect the chamber 1 with an elongated vertically positioned light transmitting tube 5, which is positioned outside of the chamber 1. A liquid seal 6, of mercury, or other heavy liquid, which will be immiscible with the liquids employed, is maintained in the lower bend of the U-tube 4. This heavy liquid 6 serves to keep separate the liquid in the chamber 1 and in the upper leg 7 of the U-tube and the colored or semi-opaque liquid 8 which is maintained in the light tube 5 and upper leg 9 of the U-tube. The enlarged sections constructed in the two legs of the U-tube 4 provide reservoirs for the liquids 2 and 8 and act to prevent any of the mercury or heavy liquid 6 from passing into either the chamber 1 or the tube 5.

A vent tube 10 provides for pressure equalization between the tube 5 and the chamber 1 and is constructed with an upturned bend or trap, such that liquids or condensible products will be substantially prevented from carrying over from the chamber 1 to the light tube 5 or vice versa.

At each end of the light tube 5, are placed transparent closures 11, such as Pyrex glass, which are sealed to the end of the tube and clamped in place by means of clamps 12. A light chamber 13 in which there is a light having a substantially constant or uniform intensity, is mounted above the upper end of light tube 5. The power for the light within the light chamber 13 may be supplied from a constant voltage transformer, or the like, such that there will not be any variations in the amount of light output from the chamber 13 to the light tube 5. It should also be noted, that the tube 5 is necessarily substantially opaque, such that there will be no loss of light therefrom and no variations in light intensity resulting from outside sources. At the opposite end of the light tube 5, there is provided a photoelectric cell 14 which reacts to the intensity of light transmitted from the light chamber 13 through the colored liquid column 8 within the light tube. Light sensitive cells, such as the one provided here, have a varying current output that increases when exposed to a greater intensity of light.

In the particular diagram shown, the photoelectric cell 14 is connected to a potentiometer type of relay or controller 15 by means of wires 16 and 17. The controller 15 has an internal pilot type of air valve which in turn controls an air supply passing through inlet conduit 18 to an outlet conduit 19. The air supplied through the conduit 19 is connected with a throttling type of air operated control valve 20, in the conduit 21, such that the valve 20 will control the liquid flow from the chamber 1. There are of course other methods and means for controlling the liquid flow to or from the chamber 1. For instance, the small varying electrical output from the cell 14 may be amplified and used to operate a step-type of electrical relay which in turn may operate motor driven or other electrically operated control valves.

The operation of the apparatus in the circuit illustrated, is such that it reacts directly upon any changes in the liquid level within the chamber 1. As the liquid level 3 rises within the chamber 1, there is an increased pressure exerted on the mercury or heavy liquid 6 within the U-tube 4, the liquid interface 22 being lowered in the first leg 7 while the liquid interface 23 in the second leg 9 is raised. Thus, the colored or semi-opaque liquid 8 has an increased column height within the light tube 5. The increased height of liquid column 8 effects a decrease in the amount of light transmitted from the chamber 13 to the sensitive cell 14, such that the electrical output of cell 14 is decreased and the controller 15 operates to change the air supply to valve 20 and in turn permit an increased liquid flow from the chamber 1 through line 21. The liquid level 3 is thereby prevented from rising any substantial distance in the chamber 1. In a reverse manner, the apparatus will operate to effect a closing or throttling of the valve 20 for a receding liquid level 3 and thus prevent any appreciable change from the pre-determined desired liquid level.

The control apparatus described above may be used with other types of valves or with entirely different flow control means, such as a motor driven pump. For example, an automatically controlled pump placed in line 21, would be of value in transferring liquids at a low pressure, in chamber 1, to a different vessel or chamber (not shown) which is maintained at a higher pressure.

In regard to the specific form of level control apparatus shown, it is obvious that various structural changes may be made in the device or its arrangement, therefore, it is not intended that this invention be limited to the exact form shown. Minor variations or mechanical substitutions, which are equivalent in nature, may well be made in the apparatus, and come within the scope of this invention.

I claim as my invention:

1. A device responsive to liquid level variations in a liquid retaining chamber comprising an elongated light transmitting tube containing a column of semi-opaque liquid, means including a liquid seal for varying the height of the liquid column in said tube directly with liquid level changes in said chamber, a constant light source at one end of said tube, and a light sensitive device at the opposite end of the tube.

2. A liquid level responsive device comprising a vertically elongated light transmitting tube containing a column of semi-opaque liquid, means for varying the height of the liquid column in said tube directly with liquid level changes in a liquid retaining chamber, said means comprising a U-shaped tube containing a heavy liquid seal connected to the lower portion of the light transmitting tube and adapted to communicate with said chamber, a constant light source at one end and a light sensitive device at the opposite end of said light transmitting tube.

3. The device of claim 2 further characterized in that the vertical legs of said U-shaped tube are provided with enlarged sections to form liquid reservoirs on opposite sides of said heavy liquid seal.

4. A liquid level responsive device comprising a vertically elongated light transmitting tube containing a column of semi-opaque liquid, means for varying the height of the liquid column in said tube directly with liquid level changes in a liquid retaining chamber, said means comprising a U-shaped tube containing a heavy liquid seal connected to the lower portion of the light transmitting tube and adapted to communicate with said chamber, a transparent closure member at each end of the light transmitting tube, a constant light source at one end and a photoelectric cell at the opposite end of the light transmitting tube.

WILLIAM E. TURVEY.

REFERENCES CITED

The following references are of record in the file of this patent:

UNITED STATES PATENTS

| Number | Name | Date |
|---|---|---|
| 1,208,830 | Pratt | Dec. 19, 1916 |
| 2,304,211 | Sparrow | Dec. 8, 1942 |
| 2,310,298 | Kuhl | Feb. 9, 1943 |
| 2,317,807 | Ryder | Apr. 27, 1943 |
| 2,323,128 | Hare | June 29, 1943 |
| 2,404,344 | Wild | July 16, 1946 |
| 2,411,248 | Cohen | Nov. 19, 1946 |